United States Patent
Fukushiro (10) Patent No.: US 9,126,577 B2
(45) Date of Patent: Sep. 8, 2015

(54) VEHICLE BRAKING SYSTEM

(75) Inventor: Eiji Fukushiro, Tokai (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 269 days.

(21) Appl. No.: 13/605,271

(22) Filed: Sep. 6, 2012

(65) Prior Publication Data

US 2013/0060440 A1   Mar. 7, 2013

(30) Foreign Application Priority Data

Sep. 7, 2011   (JP) .................................. 2011-195224

(51) Int. Cl.
*B60W 10/08*   (2006.01)
*B60T 1/10*   (2006.01)
*B60T 7/04*   (2006.01)
(Continued)

(52) U.S. Cl.
CPC ................. *B60W 10/08* (2013.01); *B60K 6/48* (2013.01); *B60L 7/14* (2013.01); *B60L 11/14* (2013.01); *B60L 15/2009* (2013.01); *B60T 1/10* (2013.01); *B60T 7/042* (2013.01); *B60T 13/586* (2013.01); *B60W 10/184* (2013.01); *B60W 30/18127* (2013.01); *B60K 2006/4825* (2013.01); *B60L 2210/40* (2013.01); *B60L 2240/421* (2013.01); *B60L 2240/423* (2013.01); *B60T 2270/604* (2013.01); *Y02T 10/6221* (2013.01); *Y02T 10/6252* (2013.01); *Y02T 10/642* (2013.10); *Y02T 10/70* (2013.01); *Y02T 10/7077* (2013.01); *Y02T 10/7241* (2013.01); *Y02T 10/7275* (2013.01)

(58) Field of Classification Search
CPC ....... B60T 8/172; B60T 7/042; B60T 13/586; B60T 1/10; B60W 10/08; B60W 10/184; B60W 30/18127; B60K 6/48; B60L 11/14; B60L 15/2009; B60L 7/14; Y02T 10/7275; Y02T 10/70; Y02T 10/6221; Y02T 10/6252
USPC .......................................................... 700/45
See application file for complete search history.

(56) References Cited

U.S. PATENT DOCUMENTS 5,992,383 A * 11/1999 Scholten et al. ............... 123/399
6,244,674 B1    6/2001 Kuno et al.
(Continued)

FOREIGN PATENT DOCUMENTS

JP           1198609       4/1999
JP       2000-197205 A    7/2000
(Continued)

*Primary Examiner* — Redhwan k Mawari
*Assistant Examiner* — Edward Torchinsky
(74) *Attorney, Agent, or Firm* — Sughrue Mion, PLLC (57) ABSTRACT

A vehicle braking system includes (a) a rotary machine that functions at least as an electricity generator and that is capable of generating braking torque based on regenerative torque, (b) a first braking control apparatus that electrically controls the braking torque of a mechanical brake that is provided for a wheel, and (c) a second braking control apparatus that replaces one of the braking torque provided by the rotary machine and the braking torque provided by the mechanical brake with another one of the braking torque provided by the rotary machine and the braking torque provided by the mechanical brake while maintaining a target braking torque, the second braking control apparatus correcting the braking torque provided by the rotary machine so that the deviation lessens, if the braking torque of a vehicle has deviation from the target braking torque at time of replacement transition.

4 Claims, 4 Drawing Sheets

(51) Int. Cl.
*B60T 13/58* (2006.01)
*B60L 7/14* (2006.01)
*B60L 11/14* (2006.01)
*B60L 15/20* (2006.01)
*B60K 6/48* (2007.10)
*B60W 10/184* (2012.01)
*B60W 30/18* (2012.01)

(56) References Cited

U.S. PATENT DOCUMENTS

| | | | |
|---|---|---|---|
| 6,739,677 B2 * | 5/2004 | Tazoe et al. | 303/152 |
| 6,813,553 B2 * | 11/2004 | Nakamura et al. | 701/70 |
| 7,136,737 B2 * | 11/2006 | Ashizawa et al. | 701/70 |
| 7,758,467 B2 * | 7/2010 | Ashizawa et al. | 477/5 |
| 2004/0054450 A1 | 3/2004 | Nakamura et al. | |
| 2004/0122579 A1 | 6/2004 | Ashizawa et al. | |
| 2008/0058154 A1 * | 3/2008 | Ashizawa et al. | 477/5 |
| 2010/0114447 A1 * | 5/2010 | Moriki et al. | 701/74 |

FOREIGN PATENT DOCUMENTS

| | | |
|---|---|---|
| JP | 2003-306138 A | 10/2003 |
| JP | 2004-155403 A | 6/2004 |
| JP | 2004196064 A | 7/2004 |
| JP | 2005-329740 A | 12/2005 |
| JP | 2007-276655 A | 10/2007 |
| JP | 2009-040376 A | 2/2009 |

* cited by examiner

VEHICLE BRAKING SYSTEM

INCORPORATION BY REFERENCE

The disclosure of Japanese Patent Application No. 2011-195224 filed on Sep. 7, 2011 including the specification, drawings and abstract is incorporated herein by reference in its entirety.

BACKGROUND OF THE INVENTION

1. Field of the Invention

The invention relates to a vehicle braking system and, more particularly, to improvement of a replacement control of replacing one of the braking torque provided by a rotary machine and the braking torque provided by a mechanical brake with the other one.

2. Description of Related Art

There is a known braking control apparatus for a vehicle which includes (a) a rotary machine that functions at least as an electricity generator and that generates braking torque based on regenerative torque, (b) and an electric brake control apparatus that electrically controls the braking torque of a mechanical brake that is provided for a wheel of the vehicle, wherein (c) one of the braking torque provided by the rotary machine and the braking torque provided by the mechanical brakes are replaced with the other one while a target braking torque is maintained. An example of this type of braking control apparatus is an apparatus described in Japanese Patent Application Publication No. 2007-276655 (JP 2007-276655 A) which is equipped with a hydraulic brake as a mechanical brake. When the vehicle speed becomes less than or equal to a predetermined speed immediately before the vehicle stops, the vehicle braking control apparatus linearly lowers the braking torque provided by the rotary machine according to decline in the vehicle speed and, at the same time, linearly raises the braking torque provided by the hydraulic brake.

Figure 6:
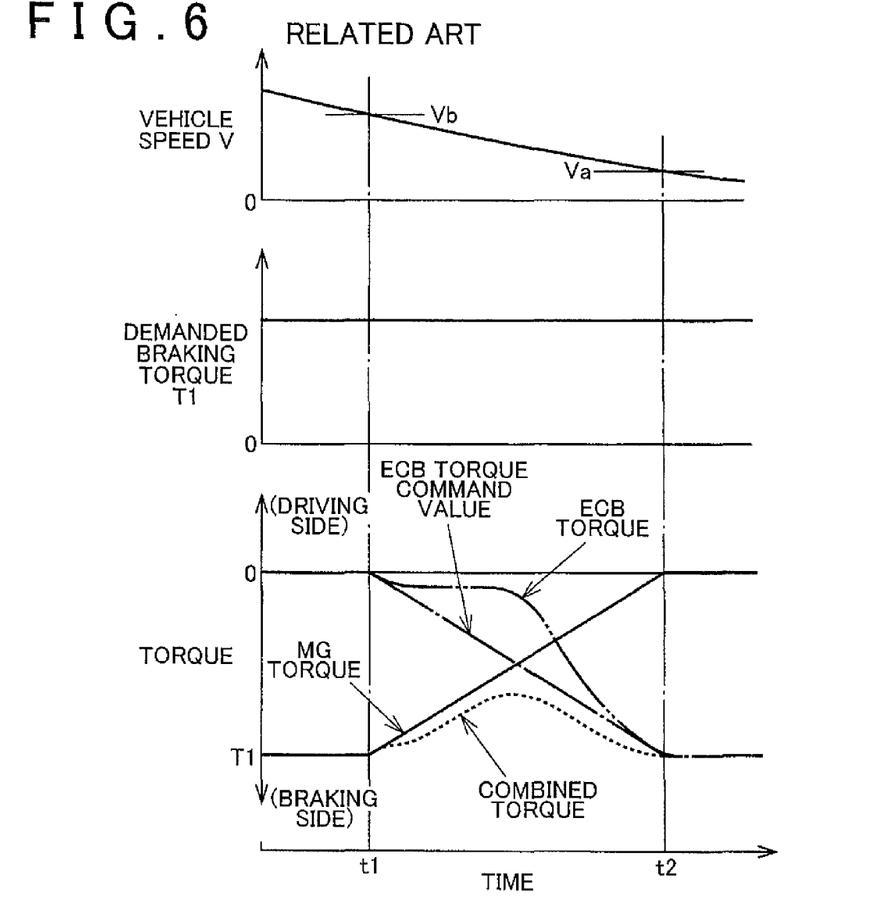
FIG. 6 is a time chart illustrating an example of a braking torque replacement control according to the related art.

However, in general, the response of the mechanical brake is lower than the response of the braking torque based on the regenerative control of the rotary machine. This difference in response sometimes results in a replacement shock in which the braking torque of the entire vehicle instantaneously declines. FIG. 6 shows a case where the braking torque provided by the rotary machine (hereinafter, referred to as "MG torque") is replaced with the braking torque provided by the mechanical brake (hereinafter, referred to as "ECB torque") in the range of vehicle speed of Vb to Va during deceleration of the vehicle during which the demanded braking torque T1 (hereinafter, referred to as "target braking torque") demanded by a driver's brake operation is substantially constant. While the ECB torque command value is linearly increased corresponding to the MG torque, the actual ECB torque changes as shown by a two-dot chain line due to response lag. As a result, the combined torque obtained by combining the MG torque and the ECB torque (which corresponds to the braking torque of the vehicle) instantaneously drops as shown by a dotted line to cause a shock. The response lag of the ECB torque depends on, for example, the oil temperature of the hydraulic oil, variations in the manufacturing precisions of various valves, etc. Therefore, the response lag of the ECB torque is not always same, so that it is difficult to achieve adaptation of the combined torque even if the changing of the MG torque is delayed by taking the response lag of the ECB torque into account.

Although in JP 2007-276655 A, the operation speed of an electric oil pump that produces the oil pressure of the hydraulic brake is raised prior to the replacement control, so that a sufficient amount of oil is secured from the commencement of the replacement control. However, this publication does not take into account the response lag due to flow resistance at all, leaving room for improvement.

Furthermore, although in JP 2007-276655 A, the braking torque provided by the rotary machine is replaced with the braking torque provided by the mechanical brake, there also is possibility of replacement shock resulting from the response lag of the mechanical brake in the case where the braking torque provided by the mechanical brake is replaced with the braking torque provided by the rotary machine.

SUMMARY OF THE INVENTION

The invention restrains the replacement shock by causing appropriate control of the combined toque (MG torque+ECB torque) obtained by combining the braking torque provided by a rotary machine (MG torque) and the braking torque provided by a mechanical brake (ECB torque) regardless of the response lag of the braking torque of the mechanical brake, when the braking torque of the rotary machine and the braking torque of the mechanical brake are replaced with each other.

The invention provides a vehicle braking system that includes (a) a rotary machine that functions at least as an electricity generator and that is capable of generating braking torque based on regenerative torque, (b) a first braking control apparatus that electrically controls the braking torque of a mechanical brake that is provided for a wheel, and (c) a second braking control apparatus that replaces one of the braking torque provided by the rotary machine and the braking torque provided by the mechanical brake with another one of the braking torque provided by the rotary machine and the braking torque provided by the mechanical brake while maintaining a target braking torque, the second braking control apparatus correcting the braking torque provided by the rotary machine so that the deviation lessens, if the braking torque of a vehicle has deviation from the target braking torque at time of replacement transition.

In the vehicle braking system as described above, if at the time of replacement transition, the braking torque of the vehicle deviates from the target braking torque, the braking torque provided by the rotary machine is corrected so that the deviation lessens. Therefore, the combined torque of the rotary machine and the mechanical brake (that corresponds to the braking torque of the vehicle) is appiropriately controlled regardless of response lag of the braking torque provided by the mechanical brake, so that the replacement shock caused by instantaneous drop or rise of the braking torque of the vehicle is restrained. In particular, since the braking torque provided by the rotary machine is excellent in response, the replacement shock is appropriately restrained regardless of response lag of the braking torque provided by the mechanical brake.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A suitably employed rotary machine that functions as an electricity generator is a motor-generator that is able to function also as an electric motor so as to produce power-running torque. Furthermore, it is also possible to adopt an electricity generator that is not capable of functioning as an electric motor, and the electricity generator and an electric motor may be separately provided. Although the invention is suitably applied to electric vehicles that travel by using a motor-generator as a drive force source, the invention may also be applied to hybrid vehicles equipped with a motor-generator and an engine that produces power by combustion of fuel, such as an internal combustion engine and the like. The engine is connected to a power transmission path on which the motor-generator is disposed, and is constructed so as to rotationally drive the same driving wheels as the motor-generator drives, and may also be disposed so as to be directly linked to the motor-generator via a connection-disconnection apparatus, for example, a friction engagement clutch or the like. Furthermore, the engine may also be disposed on a power transmission path (e.g., a front-wheel driving side) that is different from the power transmission path on which the motor-generator is disposed (e.g., a rear-wheel driving side).

The aforementioned rotary machine is connected to the power transmission path via a connection-disconnection apparatus, for example, a hydraulic type friction engagement apparatus or the like. The regenerative torque of the rotary machine is a torque provided by the rotation resistance of the rotary machine itself which is produced by a regenerative control. On the basis of the regenerative torque, a predetermined braking torque is applied to wheels via the power transmission path of an automatic transmission or the like. As for the mechanical brakes provided for vehicle wheels, a widely employed one is, for example, a hydraulic brake that produces braking torque in the form of friction force by a hydraulic cylinder. Other mechanical brakes that may be adopted include electric type mechanical brakes, and the like.

The braking control apparatus of the invention has a braking torque allotment control device that performs such a control that the target braking torque, such as the demanded braking torque and the like, is achieved by splitting the target amount to the braking torque obtained by the rotary machine and the braking torque obtained by the mechanical brake. The braking torque allotment control device is constructed so that, for example, if the braking torque based on the regenerative torque of the motor-generator reaches its maximum value, the shortfall from the target braking torque, if any, is made up for by the braking torque provided by the mechanical brake. Alternatively, the braking torque allotment control portion may split the target braking torque to the braking torque based on the regenerative torque of the motor-generator and the braking torque provided by the mechanical brake at predetermined proportions, for example, 50% for each, or the like. Thus, various modes are possible. In the case where the target braking torque is distributed to the front and rear wheels at predetermined proportions, if the braking torque based on the regenerative torque of the motor-generator is applied to only the front wheel side or the rear wheel side, it suffices that only the braking torque on that wheel side (front or rear wheel side) is set as an object of the control of the split of the braking torque between the motor-generator and the mechanical brake.

The condition for execution of the replacement control of replacing one of the braking torque provided by the rotary machine and the braking torque provided by the mechanical brake with the other one of the braking torque provided by the rotary machine and the braking torque provided by the mechanical brake while maintaining the target braking torque (replacement control executing condition) is set so that the braking torque provided by the rotary machine is replaced with the braking torque provided by the mechanical brake, for example, in the case where the vehicle speed becomes equal to or less than a predetermined vehicle speed immediately prior to a stop of the vehicle, or the case where the braking control based on the rotary machine is limited due to the amount of remaining electricity of the battery, the temperature, etc., among other cases. The replacement control is designed so that, for example, the braking torque provided by the rotary machine and the braking torque provided by the mechanical brake are linearly decreased or increased with changes in the vehicle speed. Alternatively, the braking torque provided by the rotary machine and the braking torque provided by the mechanical brake may also be linearly decreased or increased, irrespective of changes in the vehicle speed, or may be decreased or increased following predetermined non-linear patterns of change, and still other manners are also possible. Furthermore, the braking torque provided by the rotary machine may be entirely replaced with the braking provided by the mechanical brake, or a portion of the braking torque based on the rotary machine may be replaced with the braking torque provided by the mechanical brake. The invention is also applicable to the case where, due to a decline in the remaining electricity stored in the battery, or the like, the braking torque provided by the mechanical brake is replaced with the braking torque provided by the rotary machine.

In the case where the braking torque of the vehicle deviates from the target braking torque at the time of transition of the replacement, a control of correcting the braking torque provided by the rotary machine so that the deviation of the braking torque lessens is desired to be, for example, a feedback control in which an amount of correction is found according to the amount of the deviation such that the braking torque of the vehicle becomes equal to the target braking torque. Alternatively, in accordance with whether the value of the deviation is positive or negative, the braking torque provided by the rotary machine may be increased or decreased by a predetermined fixed amount at a time. Other various manners of control are also possible. The braking torque of the vehicle can be found, for example, from the vehicle acceleration, the vehicle weight, etc. Incidentally, the time of transition of the replacement means a period from when, in the replacement of the braking torque provided by the rotary machine or the braking torque provided by the mechanical brake, at least one of the braking torques is decreased or increased to when the braking torque of the vehicle becomes equal to the target braking torque by increasing or decreasing the other one of the braking torques.

Figure 1:
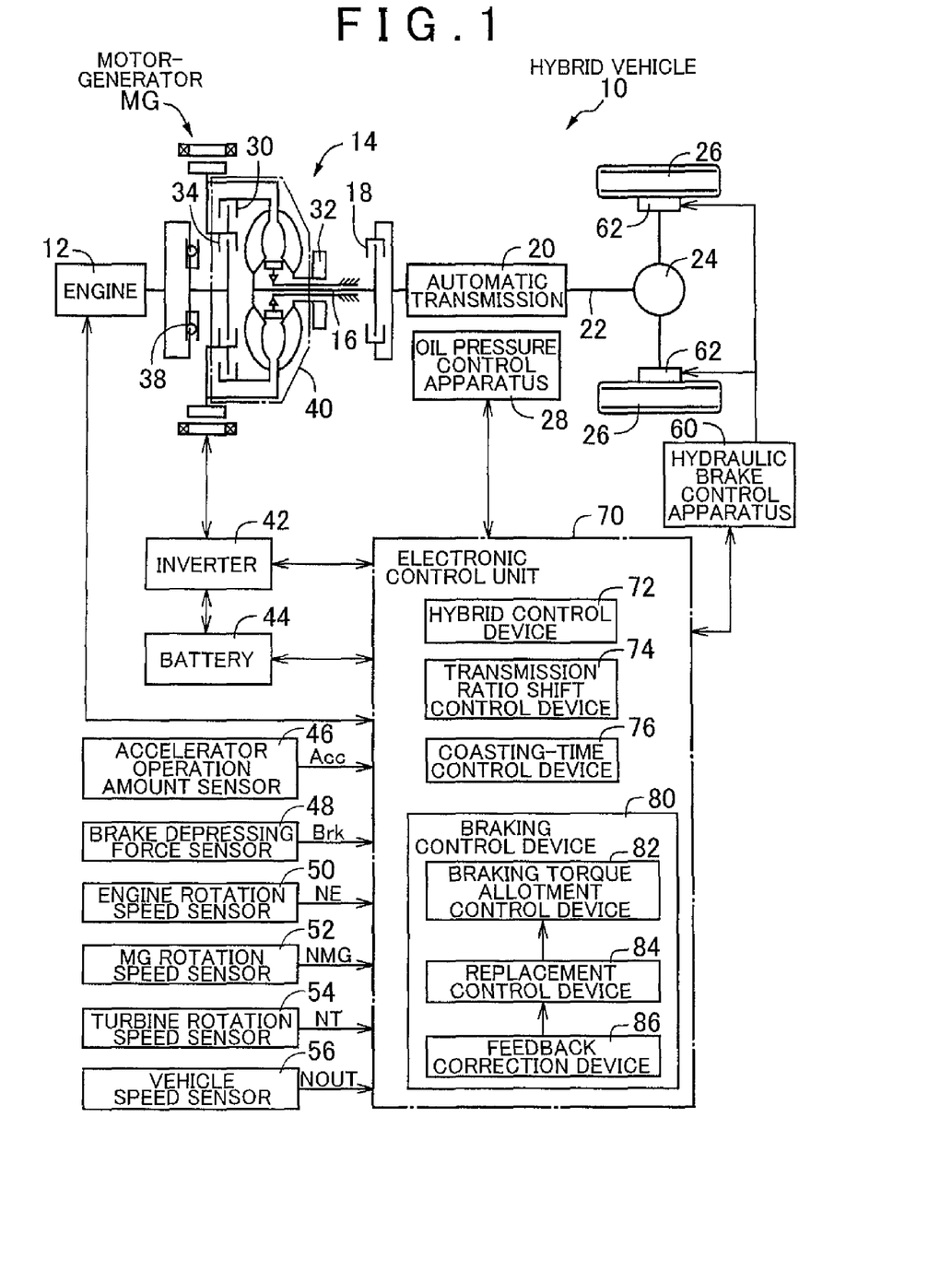
FIG. 1 is a general construction diagram showing portions of a control system, besides a skeleton diagram of a hybrid vehicle to which the invention is suitably applied.

Embodiments of the invention will be described in detail hereinafter with reference to the drawings. FIG. 1 is a general construction diagram that includes a skeleton diagram of a drive system of a hybrid vehicle 10 to which the invention is suitably applied. This hybrid vehicle 10 includes, as drive force sources, an engine 12 that is an internal combustion engine, such as a gasoline engine, a diesel engine, etc., that produces motive power by combustion of fuel, and a motor-generator MG that functions as an electric motor and an electricity generator. Then, the outputs of the engine 12 and the motor-generator MG are transferred to an automatic transmission 20 via a torque converter 14 that is a fluid power transmission apparatus, a turbine shaft 16 and a C1 clutch 18, and then is transferred to left and right driving wheels 26 via an output shaft 22 of the automatic transmission 20, and a differential gear apparatus 24. The torque converter is equipped with a lock-up clutch (L/U clutch) 30 that directly couples a pump impeller and a turbine impeller. An oil pump 32 is connected integrally to the pump impeller. The oil pump 32 is mechanically driven rotationally by the engine 12 or the motor-generator MG so as to generate the oil pressure and supply it to an oil pressure control apparatus 28. The lockup clutch 30 is engaged or released by an electromagnetic type oil pressure control valve, a switching valve, etc., that are provided in the oil pressure control apparatus 28. The motor-generator MG functions as a rotary machine.

A K0 clutch 34 that directly couples the engine 12 and the motor-generator MG via a damper 38 is provided between the engine 12 and the motor-generator MG. The K0 clutch 34 is a single-disc or multi-disc friction clutch that is put into friction engagement by a hydraulic cylinder, and is disposed in an oil-immersed state within an oil chamber 40 of the torque converter 14. The K0 clutch 34 is a hydraulic type friction engagement apparatus, and functions as a connection-disconnection apparatus that connects the engine 12 to and disconnects it from the motive power transmission path. The motor-generator MG is connected to a battery 44 via an inverter 42. Furthermore, the automatic transmission 20 is a stepped-speed automatic transmission of a planetary gear type or the like in which a plurality of gear speeds that are different in speed change ratio depending on the engaged/released states of a plurality of hydraulic type friction engagement apparatuses (clutches and brakes). A ratio shift control of the automatic transmission 20 is performed by an electromagnetic type oil pressure control valves, switching valves, etc., that are provided in the oil pressure control apparatus. The clutch C1 functions as an input clutch of the automatic transmission 20, and is also subjected to an engagement-release control by the oil pressure control apparatus 28.

The driving wheels 26 and driven wheels (not shown) are each provided with a hydraulic brake 62 that is caused to mechanically generate braking torque (hereinafter, also referred to as "ECB torque") by a hydraulic cylinder, and the braking torque is controlled by a hydraulic brake control apparatus 60. The ECB is an abbreviation of electrically controlled brake. The hydraulic brake control apparatus 60 includes electromagnetic type oil pressure control valves, switch valves, etc., and electrically controls the braking torque of each hydraulic brake 62 in accordance with a brake control signal that is output from an electronic control unit 70. The hydraulic brakes 62 function as mechanical brakes. Furthermore, the hydraulic brake control apparatus functions as a first braking control apparatus.

The electronic control unit 70 includes a microcomputer that has a CPU, a ROM, a RAM, an input-output interface, etc. Using the temporary storage function of the RAM, the electronic control unit 70 performs signal processing in accordance with programs pre-stored in the ROM. The electronic control unit 70 is supplied with a signal that represents the amount of operation of an accelerator pedal (accelerator operation amount) Acc, from an accelerator operation amount sensor 46, and is also supplied with a signal that represents the depressing force on a brake pedal (brake depressing force) Brk, from a brake depressing force sensor 48. Furthermore, the electronic control unit 70 is supplied with the rotation speed of the engine 12 (engine rotation speed) NE from an engine rotation speed sensor 50, the rotation speed of the motor-generator MG (MG rotation speed) NMG from an MG rotation speed sensor 52, the rotation speed of the turbine shaft 16 (turbine rotation speed) NT from a turbine rotation speed sensor 54, and the rotation speed of the output shaft 22 (output shaft rotation speed corresponding to the vehicle speed V) NOUT from a vehicle speed sensor 56. Various other pieces of information necessary for various controls are also supplied to the electronic control unit 70.

The electronic control unit 70 includes a hybrid control device 72, a transmission ratio shift control device 74, a coasting-time control device 76, and a braking control device 80. The hybrid control device 72 controls the operations of the engine 12 and the motor-generator MG. For example, the hybrid control device 72 switches among a plurality of predetermined vehicle travel modes, including an engine mode in which the vehicle travels by using only the engine 12 as a drive force source, a motor mode in which the vehicle travels by using only the motor-generator MG as a drive force source, an engine-and-motor mode in which the vehicle travels by using both the engine 12 and the motor-generator MG, etc., according to the state of operation of the vehicle, such as the accelerator operation amount (driver's demanded drive force) Acc, the vehicle speed V, etc. The transmission ratio shift control device 74 switches the engaged/released states of a plurality of hydraulic type friction engagement apparatuses by controlling the electromagnetic type oil pressure control valves, the switching valves, etc. that are provided in the oil pressure control apparatus 28. Due to such operations, the transmission ratio shift control device 74 switches among a plurality of gear speeds of the automatic transmission 20 in accordance with a shift map that is determined beforehand by using the states of operation of the vehicle, such as the accelerator operation amount Acc, the vehicle speed V, etc. as parameters.

Figure 3:
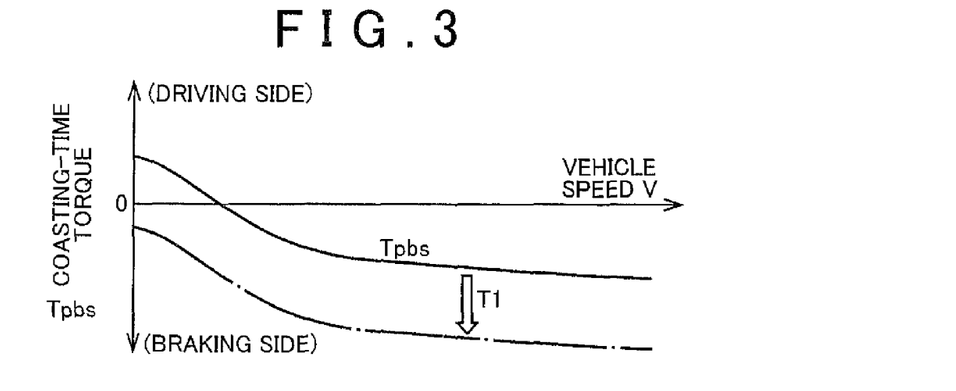
FIG. 3 is a diagram that describes coasting-time torque that is used in the execution of the braking torque replacement control shown in FIG. 2.

The coasting-time control device 76 charges a battery 44 through the regenerative control of the motor-generator MG at the time of the coasting of the vehicle with the accelerator operation amount Acc being zero, that is, the accelerator being off (coasting travel), and causes the motor-generator MG to produce predetermined creep torque through a power running control of the motor-generator MG at the time of a stop of the vehicle or at the time of low vehicle speed immediately before the vehicle stops. The coasting-time torque Tpbs shown by the solid line in FIG. 3 represents an example of a control pattern of the regenerative torque (braking side) and the power-running torque (driving side) when the vehicle coasts. In the graph, the vehicle speed V is used as a parameter.

The braking control device 80, in accordance with the demanded braking torque Tbk input thereto on the basis of the brake pedal depressing operation and the like, controls the motor-generator MG and the hydraulic brake control apparatus 60 so that the demanded braking torque Tbk is obtained. That is, the braking control device 80 controls how the demanded braking torque Tbk determined according to the brake depressing force Brk, the vehicle speed V, etc., is distributed to the driving wheel 26 side and the driven wheel side (not shown), that is, controls the distributed portions of the demanded braking torque Tbk to the driving wheel 26 side and the driven wheel side. Then, the braking control device 80 controls how the demanded braking torque T1 for the driving wheel 26 side is split to the braking torque based on the regenerative control (also termed the electricity generation control) of the motor-generator MG and the braking torque provided by the hydraulic brakes 62, that is, controls the allotted portions of the demanded braking torque T1 to the motor-generator MG and the hydraulic brakes 62. Furthermore, the braking control device 80 includes a braking torque allotment control device 82, a replacement control device 84 and a feedback correction device 86 as functions.

The braking torque allotment control device 82, for example, controls the braking torque provided by the motor-generator MG (hereinafter, also termed the MG torque) so that the braking is carried out by using only the MG torque, until the regenerative torque of the motor-generator MG reaches the maximum regenerative torque tmgmx. Then, when the braking torque provided by the motor-generator MG (MG torque) does not reach the demanded braking torque T1, the braking torque allotment control device 82 fills the shortfall from the demanded braking torque T1 with the braking torque provided by the hydraulic brakes 62 (hereinafter, also termed the ECB torque). As a result, when the vehicle decelerates, it is possible to efficiently charge the battery 44 while generating predetermined braking torque through the regenerative control of the motor-generator MG. In FIG. 3, the one-dot chain line shows a case where the brake is operated during coasting, in which case the demanded braking torque T1 is added to the coasting-time torque Tpbs. As for the braking torque for the driven wheel side where the braking torque by the motor-generator MG is not obtained, a control is performed such that predetermined braking torque is provided by the hydraulic brakes 62. The demanded braking torque T1 functions as a target braking torque for the driving wheel side.

Figure 2:
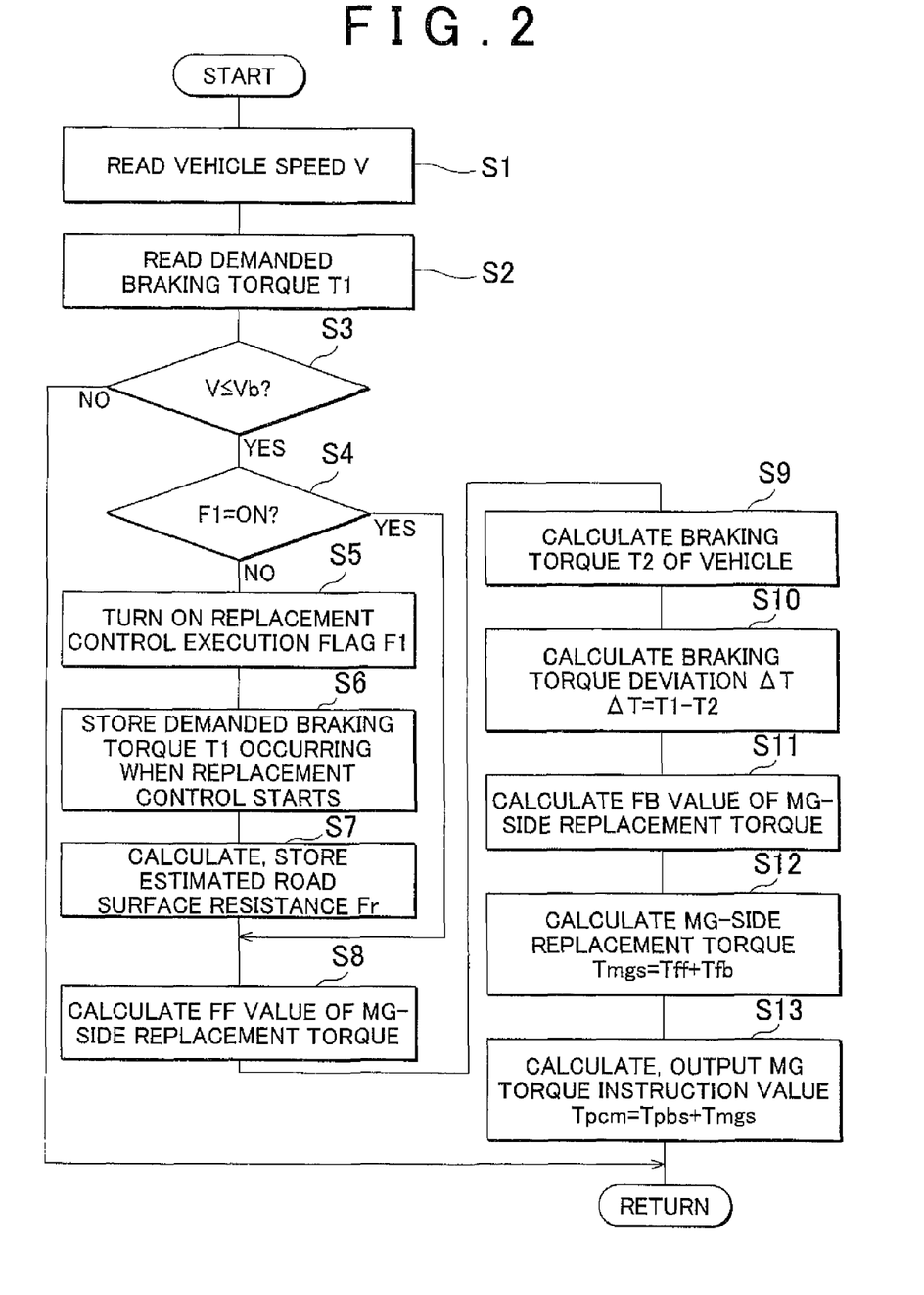
FIG. 2 is a flowchart that concretely describes a braking torque replacement control that is executed by an electronic control unit shown in FIG. 1.
Figure 4:
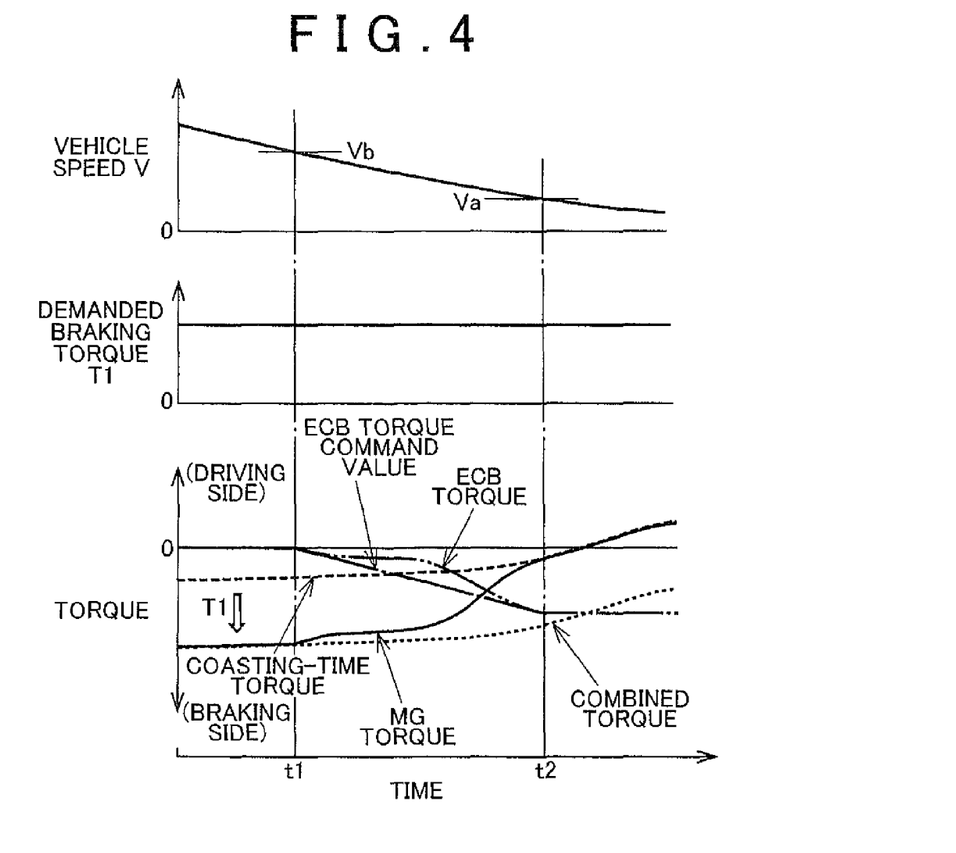
FIG. 4 is an example of a time chart showing changes in the vehicle speed, the demanded braking torque and in the torques of various portions when the replacement control of the braking torque is performed in the accordance with the flowchart shown in FIG. 2.
Figure 5:
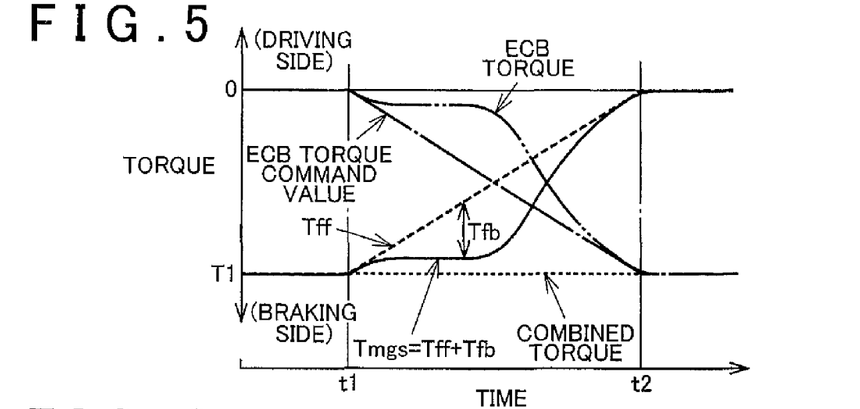
FIG. 5 is an enlarged-scale time chart showing changes in the MG torque from which the coasting-time torque is subtracted, the ECB torque, etc. shown in FIG. 4.

The replacement control device 84 controls the MG torque and the ECB torque immediately before the vehicle stops, with priority over the allotment control of the MG torque and ECB torque which is performed by the braking torque allotment control device 82. The replacement control device 84 gradually decreases the braking torque provided by the motor-generator MG (MG torque) and gradually replaces the MG torque with the braking torque provided by the hydraulic brakes 62 (ECB torque), and executes signal processing in accordance with a flowchart shown in FIG. 2. The feedback correction device 86, during execution of the replacement control by the replacement control device 84, performs feedback correction of the braking torque provided by the motor-generator MG (MG torque) so that the braking torque T2 of the vehicle becomes equal to the target braking torque, that is, the demanded braking torque T1. Steps S9 to S12 in the flowchart of FIG. 2 function as the feedback correction device 86. The process shown by the flowchart of FIG. 2 is repeatedly executed with a predetermined cycle time, so that the MG torque is gradually replaced with the ECB torque as shown in time charts in FIGS. 4 and 5. FIG. 4 shows changes in the torque that includes the coasting-time torque Tpbs. The coasting-time torque Tpbs is obtained by the motor-generator MG, regardless of the replacement control, and only the demanded braking torque T1 is subjected to the replacement of the MG torque with the ECB torque. To facilitate understanding, FIG. 5 shows changes in the torque obtained by subtracting the coasting-time torque Tpbs from the MG torque. In FIG. 5, the MG-side replacement torque Tmgs is a torque obtained by subtracting the coasting-time torque Tpbs from the MG torque shown in FIG. 4.

In step S1 in FIG. 2, the electronic control unit 70 reads the vehicle speed V. In step S2, the electronic control unit 70 reads the demanded braking torque T1 of the driving wheel side from the braking torque allotment control device 82. In step S3, it is determined whether the vehicle speed V has declined to a predetermined replacement commencement vehicle speed Vb. When V≤Vb is established, the replacement control starting at step S4 is commenced. In the time charts in FIG. 4 to FIG. 6, time t1 is the time at which the vehicle speed V declines to the replacement commencement vehicle speed Vb and therefore the replacement control is commenced. Satisfaction of V≤Vb in step S3 is a condition for executing the replacement.

In step S4, it is determined whether a replacement control execution flag F1 is on. If F1=ON, the process starting at step S8 is immediately executed. If F1=OFF, the process starting at step S5 is executed. The replacement control execution flag F1 is off in the initial state, and is turned on in step S5 in the initial or first execution of the replacement control starting at step S4. Therefore, in the first execution of step S4 after V≤Vb, F1=OFF. Subsequently in step S5, F1=ON is established. From the subsequent execution cycle on, step S4 is immediately followed by execution of the process starting at step S8.

In step S6, the demanded braking torque T1 at the time of commencement of the replacement control is stored into the RAM and the like. Then, in step S7, an estimated road surface resistance Fr is calculated, and is stored into the RAM and the like. The estimated road surface resistance Fr can be found, for example, in accordance with the following expression (1), through the use of vehicle acceleration a, an estimated propeller shaft torque Tpest, a differential gear ratio DEF, a tire diameter WR, and a reference vehicle weight M. In this embodiment, a series of replacement control processes are executed by using the estimated road surface resistance Fr and the demanded braking torque T1 that occur at the commencement of the replacement control. However, it is also possible to perform the replacement control by successively updating the demanded braking torque T1 and the estimated road surface resistance Fr.

$$Fr = M \times a - Tpest \times DEF/WR \tag{1}$$

In step S8, a feed-forward value (FF value) Tff of the MG-side replacement torque Tmgs is calculated. The feed-forward value Tff is a value for replacing the MG torque with the ECB torque during the period over which the vehicle speed V decreases from the replacement commencement vehicle speed Vb to a replacement end target vehicle speed Va. The feed-forward value Tff is found in accordance with the following expression (2), using the present vehicle speed V, the replacement end target vehicle speed Va, the replacement commencement vehicle speed Vb and the demanded braking torque T1. If the vehicle speed V declines at a substantially constant rate of change, the feed-forward value Tff changes at a constant rate of change as shown by an interrupted line in FIG. 5 (decreases provided that the braking side is defined as the positive side). In the time charts in FIG. 4 to FIG. 6, time t2 is the time at which the vehicle speed V declines to the replacement end target vehicle speed Va, and the replacement control is performed during the period of time t1 to t2.

$$Tff = T1 \times (V - Va)/(Vb - Va) \tag{2}$$

At this time, an ECB torque command value that represents an ECB-side replacement torque Tecbs obtained by subtracting the feed-forward value Tff from the demanded braking torque T1 as shown in the following expression (3) is output to the hydraulic brake control apparatus 60. Then, in accordance with the ECB torque command value (ECB-side replacement torque Tecbs), the braking torque (ECB torque) provided by the hydraulic brakes 62 is controlled. The ECB torque command value is increased corresponding to the decrease of the feed-forward value Tff (which is the MG torque in FIG. 6) as shown by the one-dot chain lines in FIGS. 5 and 6. However, the actual ECB torque changes with a delay as shown by the two-dot chain lines due to the response lag of the oil pressure, etc. FIG. 6 shows an example of the related art in which the MG torque is controlled by outputting the feed-forward value Tff without altering the value Tff. Since the MG torque, which is excellent in response, changes in accordance with a value substantially equal to the feed-forward value Tff, the response lag of the ECB torque instantaneously lowers the combined torque of the entire vehicle (that corresponds to the braking torque T2 of the vehicle) as shown by the dotted line in FIG. 6.

$$Tecbs = T1 - Tff \quad (3)$$

Referring back to FIG. 2, in step S9 subsequent to step S8, the braking torque T2 of the vehicle is calculated. The braking torque T2 of the vehicle is found, for example, in accordance with the following expression (4), using the estimated road surface resistance Fr, the coasting-time torque Tpbs, the vehicle acceleration a, the differential gear ratio DEF, the tire diameter WR and the reference vehicle weight M.

$$T2 = (M \times a - Fr - Tpbs) \times WR/DEF \quad (4)$$

In step S10, a braking torque deviation $\Delta T$ ($=T1-T2$) is calculated by subtracting the braking torque T2 of the vehicle from the demanded braking torque T1. Then in step S11, on the basis of the braking torque deviation $\Delta T$, a feedback correction value (FB value) Tfb of the MG-side replacement torque Tmgs is calculated, for example, in accordance with the following expression (5). In the expression (5), Tp is a proportional and is expressed as in Tp=$\alpha \times \Delta T$, and Ti is an integral term and is expressed as in Ti=Ti (previous value)+$\beta \times \Delta T$. The coefficients $\alpha$ and $\beta$ are appropriately determined by taking into account the response of the MG torque or the like so that the braking torque deviation $\Delta T$ becomes substantially zero and T1$\approx$T2.

$$Tfb = Tp + Ti \quad (5)$$

Subsequently, in step S12, an MG-side replacement torque Tmgs is calculated by summing the feed-forward value Tff and the feedback correction value Tfb. In step S13, an MG torque command value Tpcm is calculated by adding the coasting-time torque Tpbs to the MG-side replacement torque Tmgs. Then, the torque of the motor-generator MG is controlled in accordance with the MG torque command value Tpcm, and therefore the MG torque and the MG-side replacement torque Tmgs are changed corresponding to the actual ECB torque as shown by the solid lines in FIGS. 4 and 5. Due to this, the combined torque shown by the dotted line in FIG. 4 is caused to change so as to equal a torque obtained by adding the coasting-time torque Tpbs to the demanded braking torque T1, and in FIG. 5, the combined torque (that corresponds to the braking torque T2 of the vehicle) shown by the dotted line is kept at a constant value that is substantially equal to the demanded braking torque T1. That is, occurrence of a replacement shock caused by instantaneous drop of the combined torque as shown in FIG. 6 is restrained.

In the braking control device of the for the hybrid vehicle 10 in the embodiment, if the braking torque T2 of the vehicle deviates from the demanded braking torque T1 at the time of replacement transition, the feedback correction of the braking torque (MG torque) by the motor-generator MG is performed so that the deviation (braking torque deviation $\Delta T$) lessens. Therefore, the combined torque (MG torque+ECB torque) is appropriately controlled according to the demanded braking torque T1, regardless of the response lag of the braking torque (ECB torque) provided by the hydraulic brakes 62, so that the replacement shock caused by instantaneous drop of the braking torque T2 of the vehicle is restrained. In particular, since the braking torque (MG torque) provided by the motor-generator MG is excellent in response, the replacement shock caused by instantaneous drop of the combined torque (that corresponds to the braking torque T2 of the vehicle) as shown in FIG. 6 can be appropriately restrained, regardless of the response lag of the braking torque (ECB torque) provided by the hydraulic brakes 62.

While the embodiment of the invention has been described with reference to the drawings, the above-described embodiment is a mere example, and it is to be understood that the invention can be carried out with various changes and improvements on the basis of the knowledge of a person having ordinary skill in the art.

What is claimed is:

1. A vehicular braking control apparatus comprising:
   a rotary machine that functions at least as an electricity generator and that is capable of generating braking torque based on regenerative torque;
   a brake controller that electrically controls the braking torque of a mechanical brake that is provided in the vehicle; wherein
   switching between a braking torque produced by said rotary machine and a braking torque produced by said mechanical brake is performed while maintaining a target braking torque,
   during switching transition, a feed-forward value of braking toque produced by said rotary machine is computed based on said target braking torque, a feedback correction value is determined based on a deviation between the braking torque of the vehicle and said target braking torque, such that the braking torque and the target braking torque match, and said feedback correction value is added to said feed-forward value to perform feedback control of the braking torque produced by said rotary machine, and
   the braking torque produced by said mechanical brake is controlled according to a torque obtained by subtracting said feed-forward value from said target braking torque, regardless of a discrepancy between said braking torque of the vehicle and said target braking torque;
   wherein the brake controller calculates the feed-forward value by using a present speed of the vehicle, a replacement commencement vehicle speed, a replacement end target vehicle speed, and the target braking torque, and calculates the braking torque provided by the mechanical brake, according to the feed-forward value.

2. The vehicle braking system according to claim 1, wherein
   the brake controller performs a feedback control of finding a correction amount for the braking torque provided by the rotary machine so that the braking torque of the vehicle becomes equal to the target braking torque.

3. The vehicle braking system according to claim 2, wherein the brake controller calculates a braking torque deviation by subtracting the braking torque of the vehicle from the target braking torque, and calculates the correction amount for the braking torque provided by the rotary machine, according to the braking torque deviation.

4. The vehicle braking system according to claim 3, wherein the brake controller replaces one of the braking torque provided by the rotary machine and the braking torque provided by the mechanical brake with another of the braking torque provided by the rotary machine and the braking torque provided by the mechanical brake while maintaining the target braking torque, if a speed of the vehicle becomes less than or equal to a predetermined value.

* * * * *